(12) United States Patent
Uehara et al.

(10) Patent No.: US 11,940,761 B2
(45) Date of Patent: Mar. 26, 2024

(54) MANUFACTURING METHOD AND WATCH COMPONENT

(71) Applicant: Seiko Epson Corporation, Tokyo (JP)

(72) Inventors: Wataru Uehara, Matsumoto (JP); Yuki Takishita, Shiojiri (JP); Ai Yoshinaga, Shiojiri (JP); Atsuhiko Sugita, Suwa (JP)

(73) Assignee: SEIKO EPSON CORPORATION (JP)

( * ) Notice: Subject to any disclaimer, the term of this patent is extended or adjusted under 35 U.S.C. 154(b) by 76 days.

(21) Appl. No.: 17/408,579

(22) Filed: Aug. 23, 2021

(65) Prior Publication Data

US 2022/0057757 A1 Feb. 24, 2022

(30) Foreign Application Priority Data

Aug. 24, 2020 (JP) .................. 2020-140708

(51) Int. Cl.
*G04D 3/00* (2006.01)
*B23K 26/08* (2014.01)
*B23K 26/364* (2014.01)
*G04B 19/06* (2006.01)

(52) U.S. Cl.
CPC ....... *G04D 3/0069* (2013.01); *B23K 26/0869* (2013.01); *B23K 26/364* (2015.10); *G04B 19/06* (2013.01)

(58) Field of Classification Search
CPC ............ B23K 2103/12; B23K 2103/14; B23K 2103/26; B23K 2103/02; B23K 2103/05; B23K 2103/08; B23K 26/0624; B23K 26/08; B23K 26/40; B23K 26/364; B23K 26/0869; G04B 19/06; G04B 19/12; G04D 3/0069; G04D 3/0092
See application file for complete search history.

(56) References Cited

U.S. PATENT DOCUMENTS

| | | |
|---|---|---|
| 10,088,748 B2 | 10/2018 | Calame |
| 10,295,961 B2 | 5/2019 | Oliveira |
| 10,649,406 B2 | 5/2020 | Noirot et al. |
| 2015/0049593 A1 | 2/2015 | Oliveira |

FOREIGN PATENT DOCUMENTS

| | | |
|---|---|---|
| JP | 2011-079013 A | 4/2011 |
| JP | 2015-514582 A | 5/2015 |
| JP | 2016-121999 A | 7/2016 |
| JP | 2016-173361 A | 9/2016 |
| JP | 2016-175120 A | 10/2016 |
| JP | 2016-183961 A | 10/2016 |

*Primary Examiner* — Moshe Wilensky (74) *Attorney, Agent, or Firm* — Harness, Dickey & Pierce, P.L.C.

(57) ABSTRACT

A manufacturing method includes a first repeating step of irradiating a base material with a pulse laser, having a spot diameter S, while relatively moving a laser head and the base material in a first direction, moving the laser head by a predetermined pitch width P in a second direction that intersects the first direction, and repeating irradiation by the pulse laser along the first direction and movement of the laser head in the second direction, and a second repeating step of irradiating the base material with the pulse laser while relatively moving the laser head and the base material in the second direction, moving the laser head by the pitch width in the first direction, and repeating irradiation by the pulse laser along the second direction and movement of the laser head in the first direction, wherein S<P<100 μm.

2 Claims, 13 Drawing Sheets

| | PITCH [mm] | SCANNING SPEED [mm/sec] | THE NUMBER OF TIMES | PROCESSING SPEED [sec/mm²] | PROCESSING TIME (RATIO) | LIGHTNESS [L*] |
|---|---|---|---|---|---|---|
| FIRST CONDITION | 0.035 | 1000 | 13(12.5) | 1.43 | 1/14 | 17.92 |
| SECOND CONDITION | 0.035 | 1000 | 25 | 1.43 | 1/7 | 12.7 |
| JP-T-2015-514582 | 0.01 | 100 | 10 | 10 | 1 | 19.4 |

MANUFACTURING METHOD AND WATCH COMPONENT

The present application is based on, and claims priority from JP Application Serial Number 2020-140708, filed Aug. 24, 2020, the disclosure of which is hereby incorporated by reference herein in its entirety.

BACKGROUND

1. Technical Field

The present disclosure relates to a manufacturing method and a watch component.

2. Related Art

JP-T-2015-514582 discloses a method for forming a pattern on a front surface of a member by irradiating a member such as steel, titanium, ceramic, ruby, or sapphire with laser light. According to the method, the member is irradiated with a femtosecond laser emitting a pulse of a duration of 450 fs. A location irradiated with the laser light is colored in black, and the location irradiated with the laser light and a location that has not been irradiated have different reflectances of a front surface. The irradiation conditions are as follows: the diameter of the laser in a condensing part is 0.0273 mm, the scanning speed is 100 mm/s, and the scanning pitch is 0.01 mm.

However, in the method of JP-T-2015-514582, there was a problem in that processing took too much time due to high-density laser irradiation. Specifically, under the irradiation conditions of JP-T-2015-514582, the scanning speed is 100 mm/s and the scanning pitch is 0.01 mm, which results in high-density laser irradiation, and thus the processing time per unit area is long. Under these processing conditions, it was difficult to enhance productivity.

SUMMARY

A manufacturing method includes a first repeating step of irradiating a metal member with a pulse laser while relatively moving a laser head and the metal member in a first direction, moving the laser head by a predetermined pitch width in a second direction that intersects the first direction, and repeating irradiation by the pulse laser along the first direction and movement of the laser head to the second direction, and a second repeating step of irradiating the metal member with the pulse laser while relatively moving the laser head and the metal member in the second direction, moving the laser head by the predetermined pitch width in the first direction, and repeating irradiation by the pulse laser along the second direction and movement of the laser head in the first direction, in which S<P<100 μm, where the predetermined pitch width is P and a spot diameter of the pulse laser is S.

In a watch component, 1.3*w<d, where a depth of a recessed portion formed in an intersection region in which a groove portion of a metal member formed by laser processing along a first direction and a groove portion of the metal member formed by laser processing along a second direction intersect each other is d, and a distance between vertices of two protruding portions that sandwich the groove portion formed along the first direction or the second direction is w.

DESCRIPTION OF EXEMPLARY EMBODIMENTS

First Exemplary Embodiment

Figure 1:
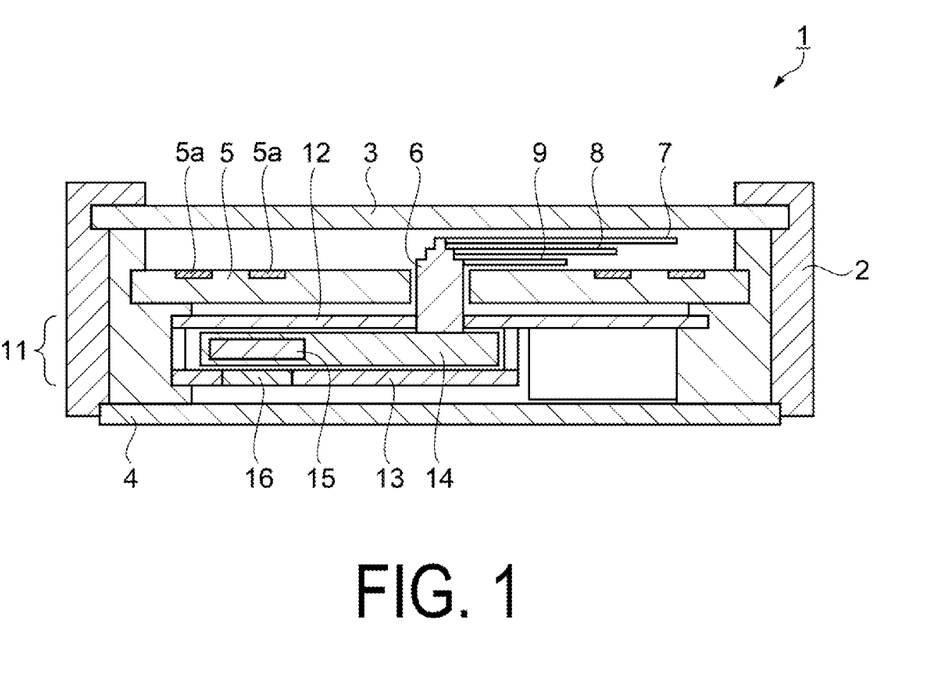
FIG. 1 is a schematic side cross-sectional view illustrating a configuration of a watch according to a first exemplary embodiment.

As illustrated in FIG. 1, a watch 1 includes an outer case 2 having a cylindrical shape. A cover glass 3 is disposed at one end of the outer case 2 along an axis of the cylindrical shape, and a case back 4 is disposed at the other end. The cover glass 3 side of the watch 1 is a front surface side, and the case back 4 side is a back surface side.

A dial 5 serving as a circular flat metal watch component is disposed on the back surface side of the cover glass 3. A graduation and a mark 5a are disposed on the front surface side of the dial 5. The mark 5a is a shape and a character. The mark 5a has a low reflectance and a dark appearance. The dial 5 has a high reflectance at a place other than the mark 5a, and thus the mark 5a stands out. In plan view of the dial 5, a hand shaft 6 is disposed at the center of the dial 5. A seconds hand 7, a minute hand 8, and an hour hand 9 that indicate time are attached to the hand shaft 6. Hereinafter, the seconds hand 7, the minute hand 8, and the hour hand 9 are referred to as hands. The hand shaft 6 is formed of three rotary shafts to which the seconds hand 7, the minute hand 8, and the hour hand 9 are attached. The cover glass 3 is transparent, and the dial 5 and the hands are visible through the cover glass 3.

A movement 11 is housed on the back surface side of the dial 5. The movement 11 includes a main plate 12 serving as a watch component, and a reception component 13 serving as a watch component. A train wheel mechanism 14 is disposed between the main plate 12 and the reception component 13. A step motor 15 is disposed on the train wheel mechanism 14. A magnetic shield plate 16 serving as a watch component is disposed on the back surface side of the step motor 15. A battery that supplies power to the step motor 15 is disposed between the main plate 12 and the case back 4. The case back 4 is transparent, and the reception component 13 and the magnetic shield plate 16 are visible through the case back 4.

Figure 2:
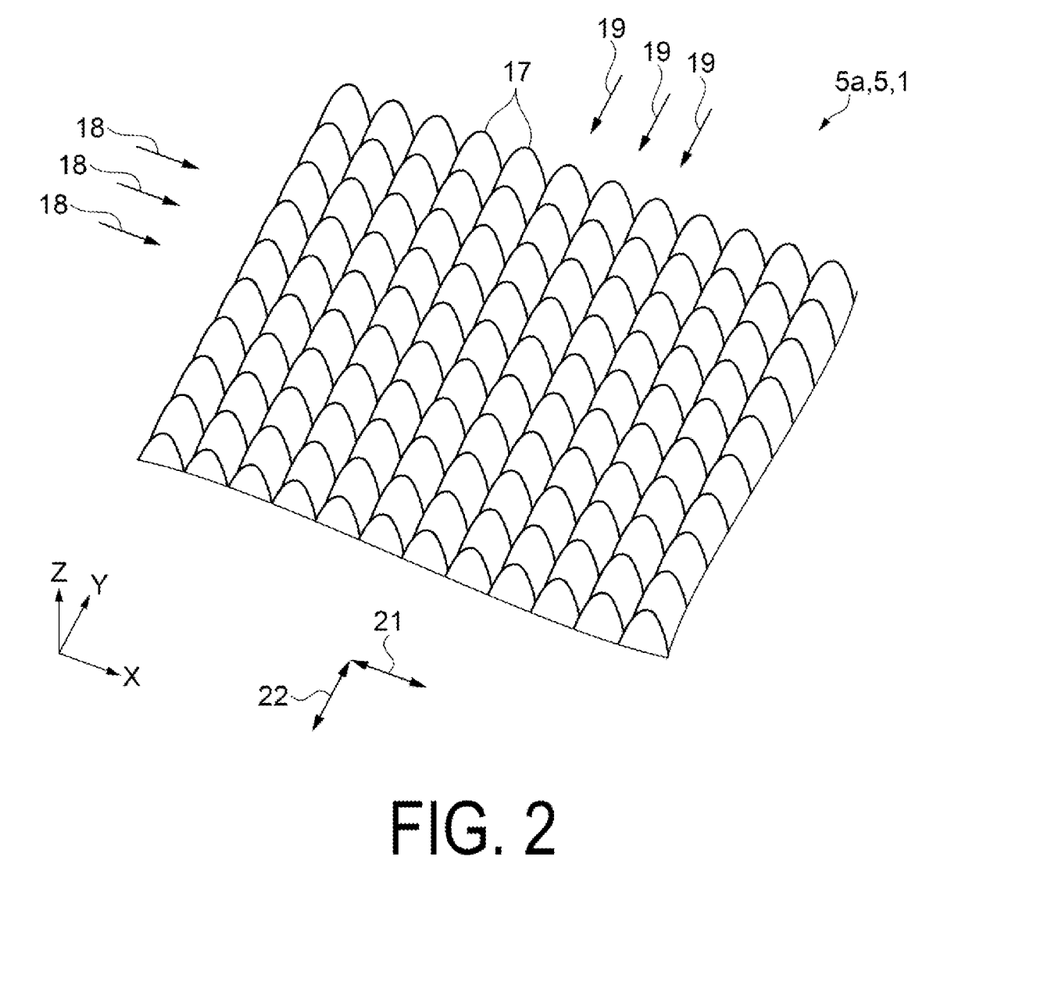
FIG. 2 is a schematic perspective view illustrating a groove shape.

As illustrated in FIG. 2, protruding portions 17 are arranged in a matrix on the mark 5a of the dial 5. A pitch of the protruding portions 17 is less than 100 μm. Therefore, the shape of the protruding portions 17 is visually unrecognizable. The protruding portions 17 are aligned in two orthogonal directions. The two directions are assumed to be an X direction and a Y direction. A direction orthogonal to the X direction and the Y direction is assumed to be a Z direction. Alternatively, a normal line direction of a surface including the mark 5a in the dial 5 is assumed to be the Z direction. Further, it is assumed that a direction from the dial 5 toward the cover glass 3 is a positive Z direction, and the opposite direction thereof is a negative Z direction.

The dial 5 includes first grooves 18 as groove portions extending in the X direction, and second grooves 19 as groove portions extending in the Y direction. The protruding portions 17 are disposed between the first grooves 18 and the second grooves 19. The X direction in which the first grooves 18 extend is assumed to be a first direction 21. The Y direction in which the second grooves 19 extend is assumed to be a second direction 22.

Light incident on the first grooves 18 and the second grooves 19 of light incident on the mark 5a from the positive Z direction is repeatedly reflected between side surfaces of the protruding portions 17. In the first grooves 18 and the second grooves 19, the light advances in the negative Z direction while being absorbed by the side surface of the protruding portions 17. Thus, the intensity of the light reflected in the positive Z direction is small. The mark 5a has a reflectance smaller than that of a surface other than the mark 5a.

Next, a method for manufacturing the mark 5a will be described.

Figure 3:
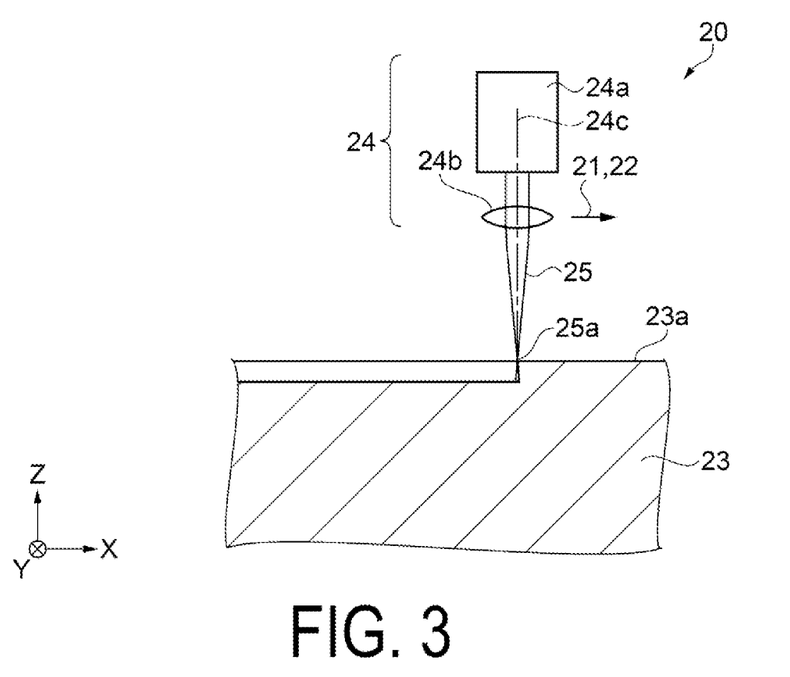
FIG. 3 is a schematic side cross-sectional view for illustrating a method for manufacturing a groove.

As illustrated in FIG. 3, a base material 23 is prepared as a metal member. A material of the base material 23 is any of brass, pure iron, stainless steel, nickel silver, titanium, and tungsten. According to the manufacturing method, the metal member of brass, pure iron, stainless steel, nickel silver, titanium, and tungsten can have a place where the intensity of the light reflected by the first groove 18 and the second groove 19 is small. Further, in addition to the above, the manufacturing method of the present disclosure can also be applied to various alloys used in a watch.

A laser irradiator 20 includes a laser head 24. The laser irradiator 20 includes a mechanism for relatively moving the base material 23 and the laser head 24. The laser irradiator 20 irradiates the base material 23 with a pulse laser 25 while relatively moving the laser head 24 and the base material 23 in the first direction 21 or the second direction 22. The laser head 24 includes a laser emitting unit 24a and a condensing optical system 24b. The laser emitting unit 24a emits the pulse laser 25 that is a femtosecond laser. The femtosecond laser is a certain type of laser that generates an ultrashort pulse of a duration approximately from several femtoseconds to hundreds of femtoseconds. One femtosecond is $10^{-15}$ seconds. In the present exemplary embodiment, the laser head 24 irradiates the base material 23 with the pulse laser 25, for example, having an output of 13 W and a frequency of 1700 kHz while moving at a speed of 1000 mm/s.

The condensing optical system 24b condenses the pulse laser 25 onto a focal part 25a. The focal part 25a is formed on an optical axis 24c of the condensing optical system 24b. Since the energy of the pulse laser 25 is great at the focal part 25a, metal particles are removed from a front surface 23a of the base material 23. When the base material is irradiated with such a pulse laser once, metal particles at a depth of about 4 μm are removed. When the laser head 24 and the base material 23 are relatively moved, a groove having a depth of about 4 μm is formed.

Figure 4:
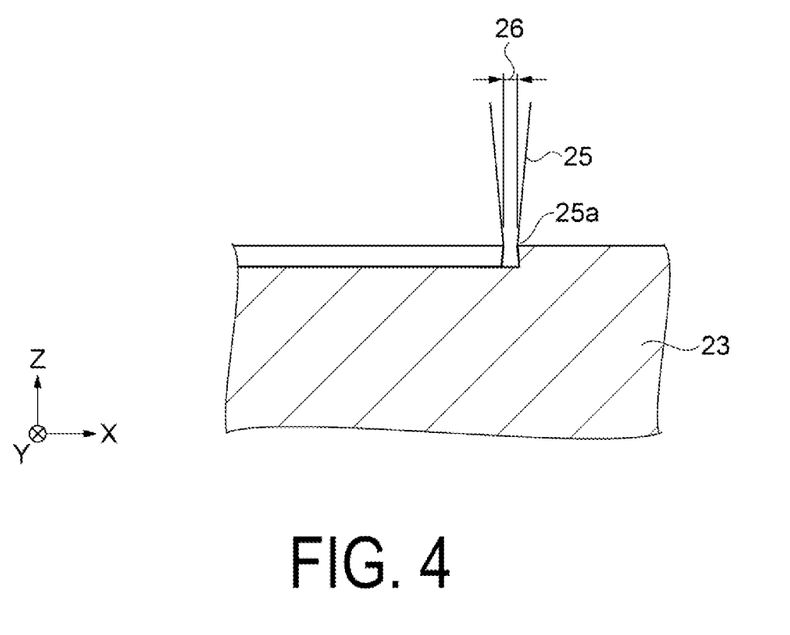
FIG. 4 is a schematic side cross-sectional view for illustrating the method for manufacturing the groove.

As illustrated in FIG. 4, the pulse laser 25 is condensed by the condensing optical system 24b, and a cross-sectional area is the smallest at the focal part 25a. The diameter of the focal part 25a is assumed to be a spot diameter 26. In the present exemplary embodiment, the spot diameter 26 is, for example, 25 μm, which is not limited thereto.

Figure 5:
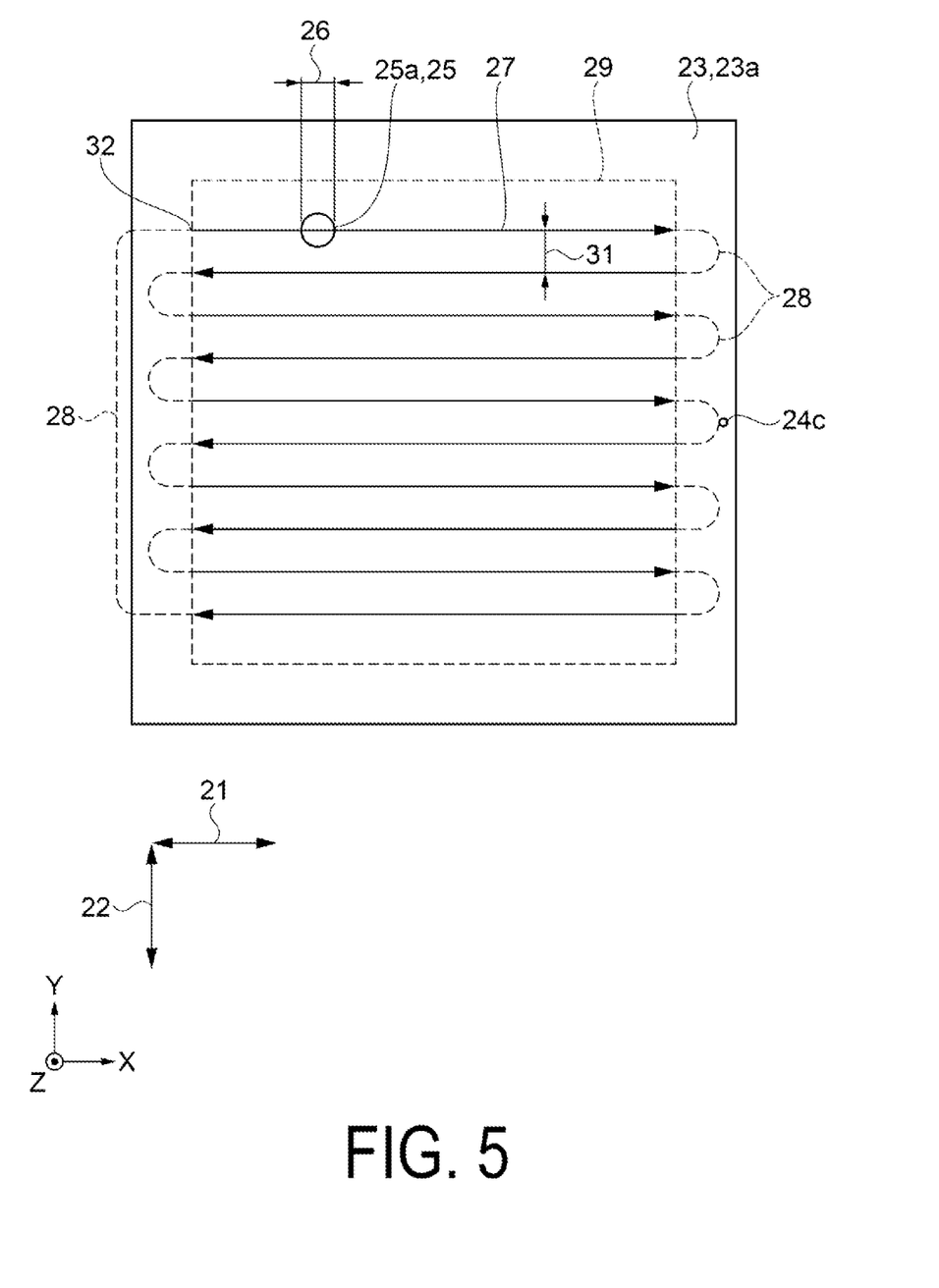
FIG. 5 is a schematic plan view for illustrating the method for manufacturing the groove.

A first repeating step is performed as illustrated in FIG. 5. In the first repeating step, the laser irradiator 20 irradiates the base material 23 with the pulse laser 25 while relatively moving the laser head 24 and the base material 23 in the first direction 21. The first direction 21 includes a positive X direction and a negative X direction. An irradiation path 27 indicated by a solid line is a path in which the focal part 25a moves. In the present exemplary embodiment, the mark 5a is formed in an irradiation region 29 surrounded by a broken line. The shape of the irradiation region 29 is not particularly limited. The irradiation path 27 is disposed from an end to an end of the irradiation region 29 in the first direction 21.

The laser irradiator 20 moves the laser head 24 by a predetermined pitch width 31 in the second direction 22 that intersects the first direction 21. At this time, the base material 23 is not irradiated with the pulse laser 25, and the optical axis 24c of the condensing optical system 24b moves along a non-irradiation path 28. The non-irradiation path 28 indicated by a broken line is a path on which the optical axis 24c of the condensing optical system 24b moves without irradiation by the pulse laser 25. The non-irradiation path 28 is disposed outside the irradiation region 29.

In the first repeating step, the irradiation by the pulse laser 25 along the first direction 21, and a movement of the laser head 24 to the second direction 22 are repeated. On the irradiation path 27, the focal part 25a moves in an arrow direction of the irradiation path 27. On the irradiation path 27, the focal part 25a alternately moves in the positive X direction and the negative X direction.

The irradiation path 27 and the non-irradiation path 28 are alternately coupled to form one closed curve. A start point 32 is set in the negative X direction and a positive Y direction of the irradiation region 29. The focal part 25a and the optical axis 24c of the condensing optical system 24b start moving from the start point 32, and alternately pass through the irradiation path 27 and the non-irradiation path 28. The optical axis 24c returns to the start point 32 at the end.

Figure 6:
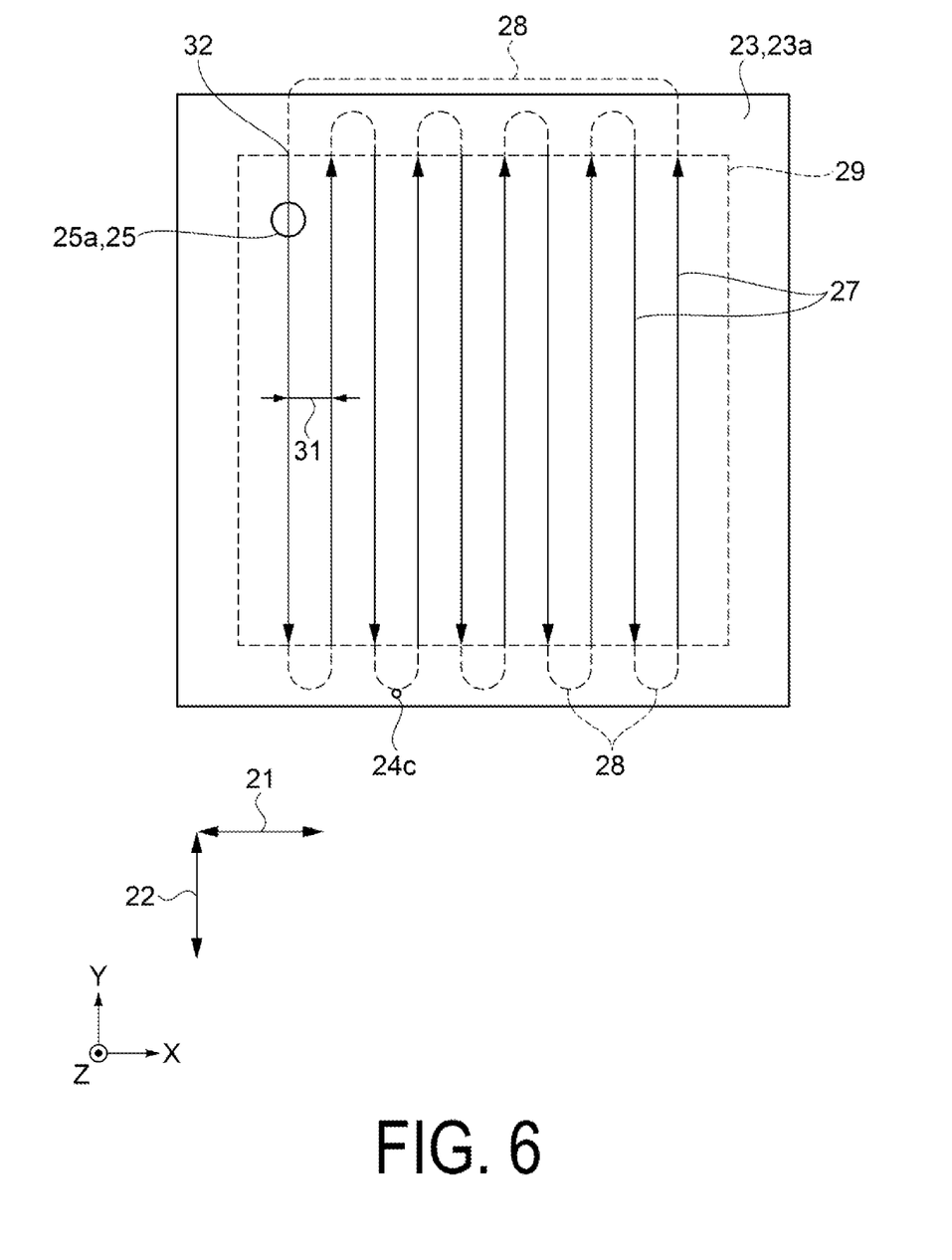
FIG. 6 is a schematic plan view for illustrating the method for manufacturing the groove.

Next, a second repeating step illustrated in FIG. 6 is performed. In the second repeating step, the laser irradiator 20 irradiates the base material 23 with the pulse laser 25 while relatively moving the laser head 24 and the base material 23 in the second direction 22. The second direction 22 includes the positive Y direction and a negative Y direction. The irradiation path 27 indicated by the solid line is the path on which the focal part 25a moves. The irradiation path 27 is disposed from an end to an end of the irradiation region 29 in the second direction 22.

The laser irradiator 20 moves the laser head 24 by the predetermined pitch width 31 in the first direction 21. At this time, the base material 23 is not irradiated with the pulse laser 25, and the optical axis 24c of the condensing optical system 24b moves along the non-irradiation path 28. The non-irradiation path 28 is disposed outside the irradiation region 29.

In the second repeating step, the irradiation by the pulse laser 25 along the second direction 22, and a movement of the laser head 24 to the first direction 21 are repeated. On the irradiation path 27, the focal part 25a moves in an arrow direction of the irradiation path 27. On the irradiation path 27, the focal part 25a alternately moves in the positive Y direction and the negative Y direction.

The irradiation path 27 and the non-irradiation path 28 are alternately coupled to form one closed curve. The focal part 25a and the optical axis 24c of the condensing optical system 24b start moving from the start point 32, and alternately pass through the irradiation path 27 and the non-irradiation path 28. The optical axis 24c finally returns to the start point 32.

In the first repeating step and the second repeating step, P is set in a range of S<P<100 μm, where the predetermined pitch width 31 is P and the spot diameter 26 of the pulse laser 25 is S. According to the manufacturing method, the pitch width 31 is greater than the spot diameter 26 of the pulse laser 25, and thus the plurality of protruding portions 17 can be formed by the first repeating step and the second repeating step. Further, processing time per unit area can be shortened as compared to the known technique described above. Further, in the first repeating step and the second repeating step, the pitch width 31 is smaller than 100 μm. Thus, the plurality of protruding portions 17 having a size that is difficult to be visually recognizable by the naked eye can be formed, and thus design that does not impair an aesthetic appearance can be represented while suppressing reflection of light.

Figure 7:
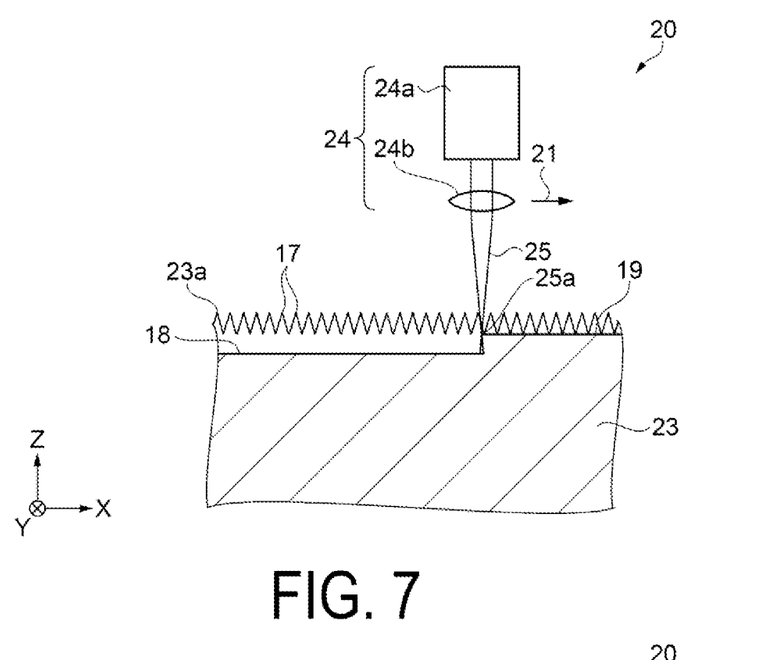
FIG. 7 is a schematic side cross-sectional view for illustrating the method for manufacturing the groove.

As described above, the depth of the groove that can be drilled once by the pulse laser in the present exemplary embodiment is limited. The first repeating step and the second repeating step need to be repeated in order to form a groove having a desired depth or a protruding portion having a desired height. FIG. 7 is a schematic view for illustrating the first repeating step and the second repeating step for an N-th time (N≥2). As illustrated in FIG. 7, a position of the focal part 25a in the Z direction is moved in the negative Z direction, and becomes deeper from the front surface 23a. Next, the second repeating step is performed after the first repeating step again. The focal part 25a moves again along the irradiation path 27. Thus, the first groove 18 and the second groove 19 become deeper.

Figure 8:
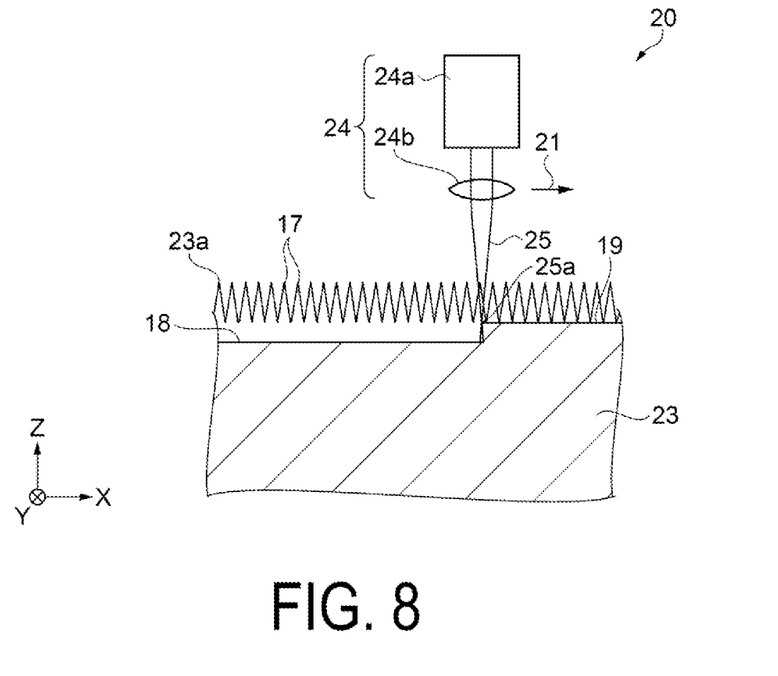
FIG. 8 is a schematic side cross-sectional view for illustrating the method for manufacturing the groove.

FIG. 8 is a schematic view for illustrating the first repeating step and the second repeating step for an N+M-th time (N≥2 and M≥1). As illustrated in FIG. 8, a position of the focal part 25a in the Z direction is moved in the negative Z direction, and further becomes deeper from the front surface 23a. The second repeating step is performed after the first repeating step again. Then, performing the second repeating step after the first repeating step is repeated for a predetermined number of times. Thus, the first groove 18 and the second groove 19 further become deeper. Repeating the second repeating step after the first repeating step for the predetermined number of times can form an arbitrary brightness according to the number of times.

Figure 9:
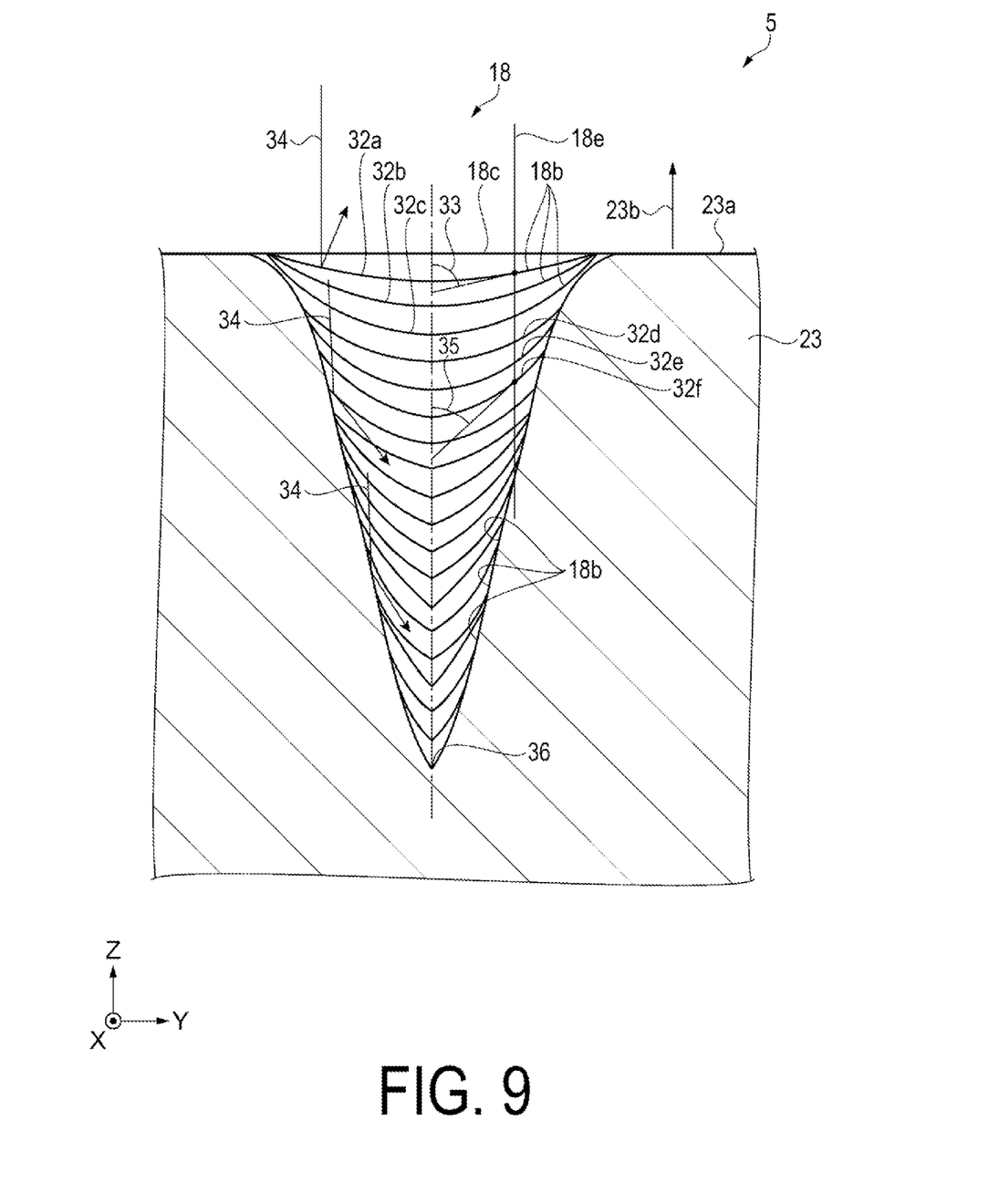
FIG. 9 is a schematic side cross-sectional view for illustrating the method for manufacturing the groove.

FIG. 9 is a diagram schematically illustrating a change in the depth of the groove when the irradiation of the base material by the pulse laser is repeated for a predetermined number of times. In other words, FIG. 9 illustrates a depth of the groove according to the number of times the first repeating step and the second repeating step are repeated in the present exemplary embodiment. The greater the number of times the steps are repeated for the base material 23, the deeper the depth of the first groove 18. FIG. 9 is a cross section when the first groove 18 is viewed from the positive X direction. When the number of repetitions is one, a groove 32a in a first stage is formed. When the number of repetitions is two, a groove 32b in a second stage is formed. In other words, according to the number of repetitions, the first groove 18 becomes deeper in an order of the groove 32a in the first stage, the groove 32b in the second stage, a groove 32c in a third stage, a groove 32d in a fourth stage, a groove 32e in a fifth stage, and a groove 32f in a sixth stage. Note that, when the number of repetitions increases, control may be performed so as to maintain a constant distance between the laser head 24 and the irradiation region 29 by moving the laser head 24 along a Z-axis. In this case, control can be performed such that, after the first repeating step and the second repeating step are performed, the laser head 24 is moved in the −Z direction, and the first repeating step and the second repeating step are then performed again.

When the first groove 18 is shallow like the groove 32a in the first stage, a first angle 33 formed between a tangent line of a side surface 18b and a normal line direction 23b of the front surface 23a is great. For example, provided that a position of the side surface 18b is a first comparison location 18e moved by ¼ of a width of the first groove 18 in the Y direction from a first bottom portion 36, a tangent line of the side surface 18b in the first comparison location 18e is used for comparison. At this time, light 34 applied to the side surface 18b easily advances toward an opening 18c of the first groove 18. As the first groove 18 becomes deeper, the angle formed between the tangent line of the side surface 18b and the normal line direction 23b of the front surface 23a becomes smaller.

For example, when the first groove 18 is deep in such a manner as the groove 32f in the sixth stage, a sixth angle 35 formed between the tangent line of the side surface 18b and the normal line direction 23b of the front surface 23a is smaller than the first angle 33. Provided that a bottom of the first groove 18 is the first bottom portion 36, the light 34 applied to the side surface 18b easily advances toward the first bottom portion 36. Thus, when the first groove 18 is shallow, the first groove 18 appears bright, and the deeper the first groove 18 becomes, the darker the first groove 18 appears. By changing a depth of the first bottom portion 36, the brightness of reflected light can be changed.

Figure 10:
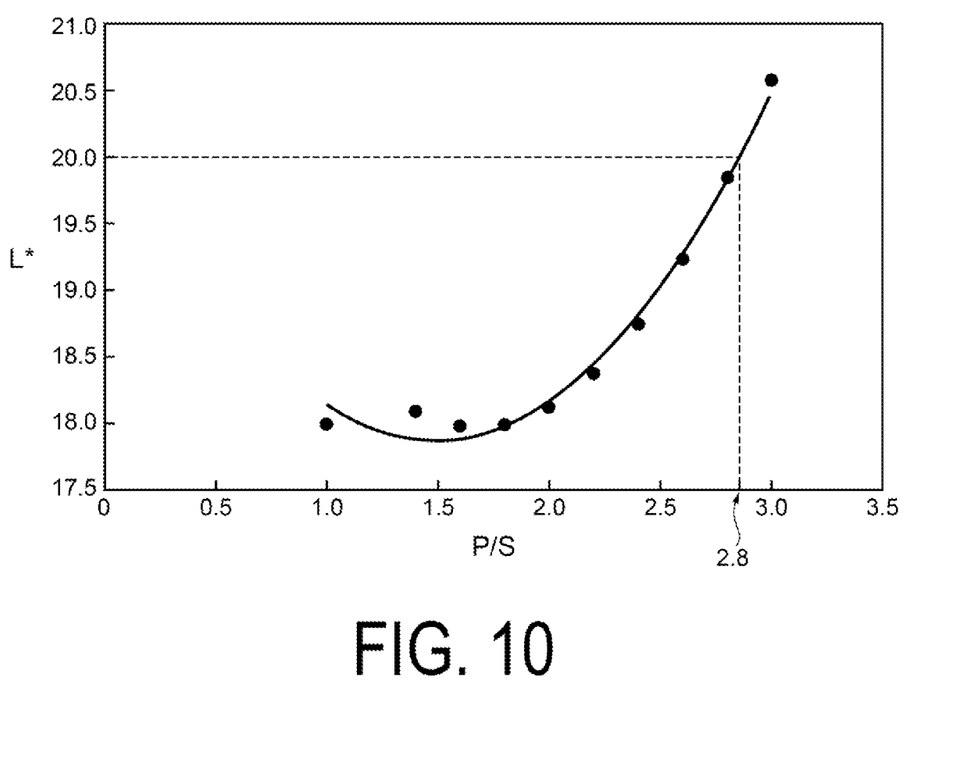
FIG. 10 is a diagram for illustrating a relationship between a pitch of the groove and a spot diameter, and a brightness.

FIG. 10 illustrates an example of a relationship between a ratio of the pitch width 31 and the spot diameter 26 of the base material 23, and a brightness L* of the reflected light 34. A horizontal axis indicates a value acquired by dividing P indicating the pitch width 31 by S indicating the spot diameter 26. A vertical axis indicates the brightness L* of the light 34 reflected by the base material 23. The material of the base material 23 is brass.

The brightness L* is equal to or less than 20 in a range of 1<P/S<2.8. When the brightness L* is equal to or less than 20, a difference in reflectance from a region in which the front surface 23a is flat is great, and thus the mark 5a is easy to see. In the irradiation region 29 of the base material 23, the range of the pitch width 31 is 1.0*S<P<2.8*S. According to the manufacturing method, the pitch width 31 in the second direction 22 when the pulse laser 25 is scanned and applied in the first direction 21 is greater than 1.0 times the spot diameter 26. When the pitch width 31 in the second direction 22 is smaller than 1.0 times the spot diameter 26, the number of the first groove 18 and the second groove 19 per unit area is great, and thus the processing time is long and productivity is low.

The pitch width 31 in the second direction 22 when the pulse laser 25 is scanned and applied in the first direction 21 is smaller than 2.8 times the spot diameter 26. When the pitch width 31 in the second direction 22 is greater than 2.8 times the spot diameter 26, a vertex of the protruding portion 17 between scanned lines becomes flat, and thus reflection easily occurs at the vertex. Thus, the brightness of the reflected light 34 increases. When the pitch width 31 in the second direction 22 is smaller than 2.8 times the spot diameter 26, the vertex of the protruding portion 17 between the scanned lines can protrude, and thus the reflection of the light 34 applied to the base material 23 can be suppressed.

The pitch width 31 and the spot diameter 26 in the irradiation region 29 have variations. P in the equation of 1<P/S<2.8 is an average value of the pitch width 31. S is an average value of the spot diameter 26.

Figure 11:
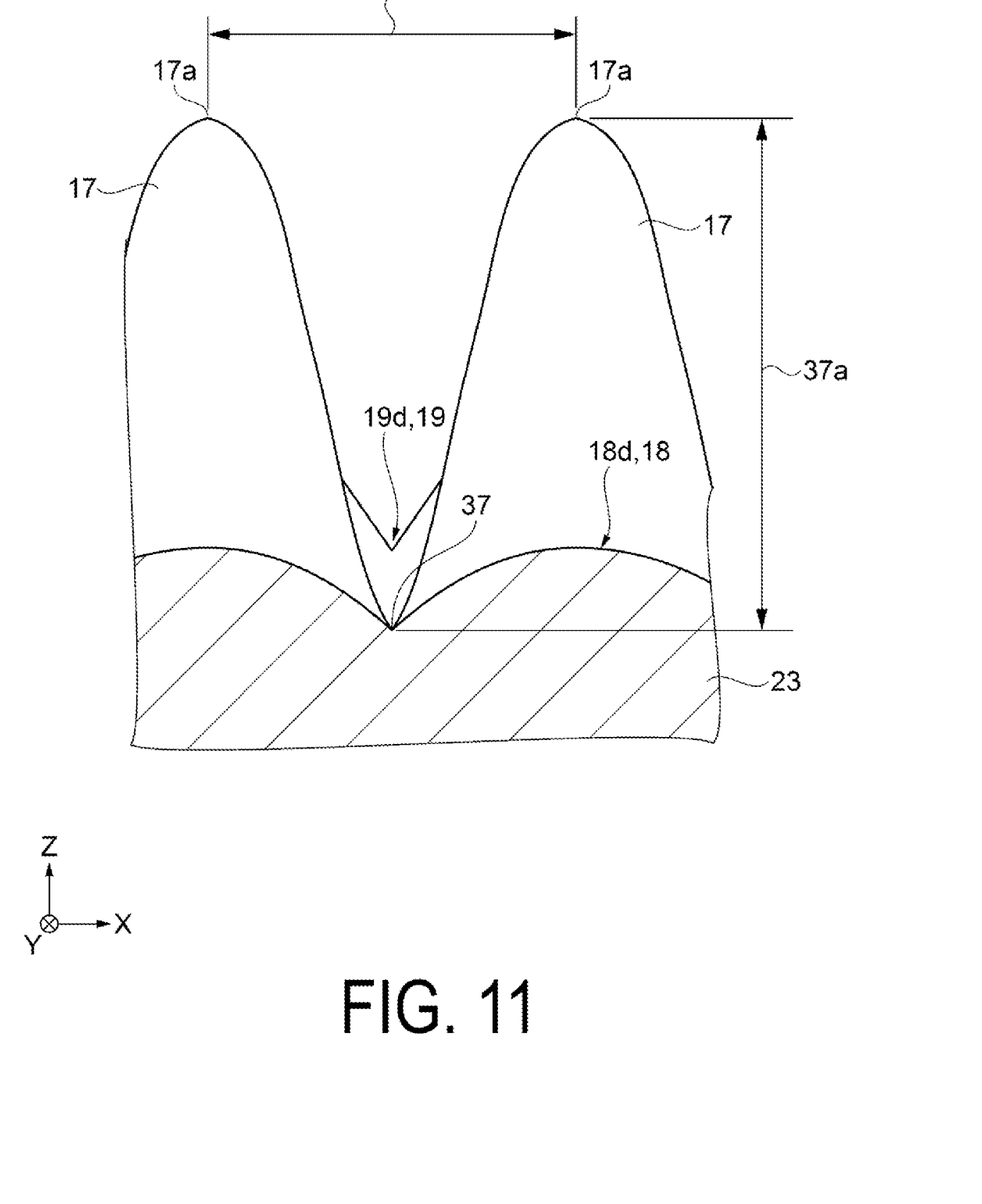
FIG. 11 is a schematic view for illustrating a depth of the groove.

FIG. 11 is a diagram when a cross section of the base material 23 along the first groove 18 is viewed from the negative Y direction. As illustrated in the diagram, a first bottom 18d being a bottom of the first groove 18 is deep at a location that intersects the second groove 19. A second bottom 19d being a bottom of the second groove 19 is also deep at a location that intersects the first groove 18. An indentation in an intersection region in which the first bottom 18d and the second bottom 19d intersect each other is assumed to be a recessed portion 37.

A recessed portion depth 37a is a depth of the recessed portion 37 in the intersection region in which the first groove 18 formed by laser processing on a line along the first direction 21 of the base material 23 in the first repeating step, and the second groove 19 formed by laser processing on a line along the second direction 22 of the base material 23 in the second repeating step intersect each other. The recessed portion depth 37a is assumed to be d. An inter-vertex distance 17b is a distance between vertices 17a of two protruding portions 17 that sandwich the first groove 18 formed along the first direction 21 or the second groove 19 formed along the second direction 22. The inter-vertex distance 17b is assumed to be w. The relationship between the inter-vertex distance 17b and the recessed portion depth 37a is 1.3*w<d.

In other words, the dial 5 includes the recessed portion 37 in the intersection region in which the first groove 18 and the second groove 19 intersect each other. The recessed portion depth 37a that is the depth of the recessed portion 37 is d. The dial 5 includes two protruding portions 17 that sandwich the first groove 18. The inter-vertex distance 17b that is the distance between the vertices 17a of the two protruding portions 17 is w. The dial 5 includes two protruding portions 17 that sandwich the second groove 19. The inter-vertex distance 17b that is the distance between the vertices 17a of the two protruding portions 17 is also w. The relationship between the inter-vertex distance 17b and the recessed portion depth 37a is 1.3*w<d.

Figure 12:
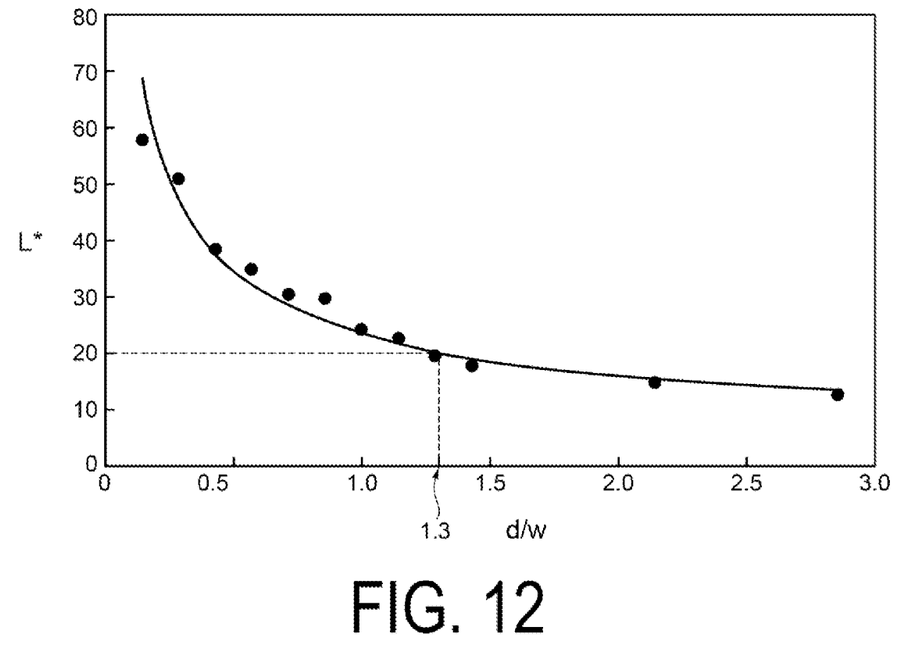
FIG. 12 is a diagram for illustrating a relationship between a depth of the groove and a distance between vertices, and a brightness.

FIG. 12 illustrates an example of a relationship between a ratio of the inter-vertex distance 17b between two adjacent protruding portions 17 that sandwich the groove and the recessed portion depth 37a, and the brightness L* of the reflected light 34. A horizontal axis indicates a value acquired by dividing d indicating the recessed portion depth 37a by w indicating the inter-vertex distance 17b. The brightness L* of a vertical axis indicates the brightness L* of the light 34 reflected by the base material 23. The material of the base material 23 is brass. The brightness L* is equal to or less than 20 in a range of 1.3<d/w. When the brightness L* is equal to or less than 20, a difference in reflectance between a flat region in which the mark 5a is not formed on the front surface 23a and a region in which the mark 5a is formed is great, and thus the mark 5a is easy to see.

According to the manufacturing method and the dial 5, the recessed portion depth 37a is deeper than 1.3 times the inter-vertex distance 17b between the two protruding portions 17 that sandwich the first groove 18 along the first direction 21. The angle formed between the side surface 18b of the first groove 18 and the normal line direction 23b of the front surface 23a of the base material 23 becomes smaller. The same also applies to the second groove 19. Therefore, an advance, in the normal line direction 23b of the front surface 23a of the base material 23, of the light 34 applied to the first groove 18 and the second groove 19 can be suppressed.

The inter-vertex distance 17b and the recessed portion depth 37a in the irradiation region 29 have variations. w in the equation of 1.3*w<d is an average value of the inter-vertex distance 17b. d is an average value of the recessed portion depth 37a.

Figure 13:
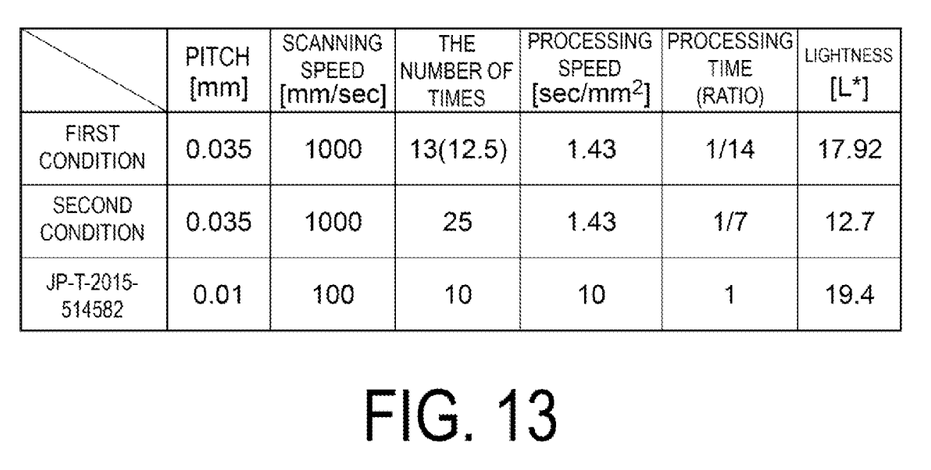
FIG. 13 is a diagram for illustrating a processing speed.

FIG. 13 illustrates processing conditions according to JP-T-2015-514582 and processing conditions according to the present exemplary embodiment. The processing conditions according to the present exemplary embodiment are illustrated in rows of first conditions and second conditions in FIG. 13. The processing conditions according to JP-T-2015-514582 are illustrated in a row corresponding to JP-T-2015-514582. A material of a workpiece according to JP-T-2015-514582 is steel, and a material of a workpiece according to the present exemplary embodiment is brass. Both of the materials of the workpiece according to JP-T-2015-514582 and the present exemplary embodiment are a metal material, and can be processed in substantially the same manner.

A value indicated in a column for a processing time indicates a ratio in which the processing time is estimated under the processing conditions indicated in JP-T-2015-514582, and is compared to a processing time according to the present exemplary embodiment. In the first condition, the brightness is substantially the same as that in JP-T-2015-514582. The processing time under the first conditions is 1/14 of the processing time according to JP-T-2015-514582. Therefore, the processing time is greatly reduced. Under the second conditions, the brightness is lower than that in JP-T-2015-514582. At this time, the processing time in the second condition is 1/7 of the processing time according to JP-T-2015-514582. Therefore, the processing time is greatly reduced. When the material of the workpiece is pure iron, stainless steel, or nickel silver, processing can also be performed for a processing time similar to that when brass is used.

Second Exemplary Embodiment

In the first exemplary embodiment described above, the angle formed between the first direction 21 and the second direction 22 is 90°. Provided that the angle formed between the first direction 21 and the second direction 22 is θ, θ may be 30°≤θ≤120°. At this time, the protruding portion 17 surrounded by the first groove 18 and the second groove 19 is rhombic in plan view of the base material 23. According to the manufacturing method, the angle formed between the first direction 21 and the second direction 22 is equal to or greater than 30° and equal to or less than 120°, and thus a groove can be formed along a line extending in the first direction 21 and a line extending in the second direction 22.

Figure 14:
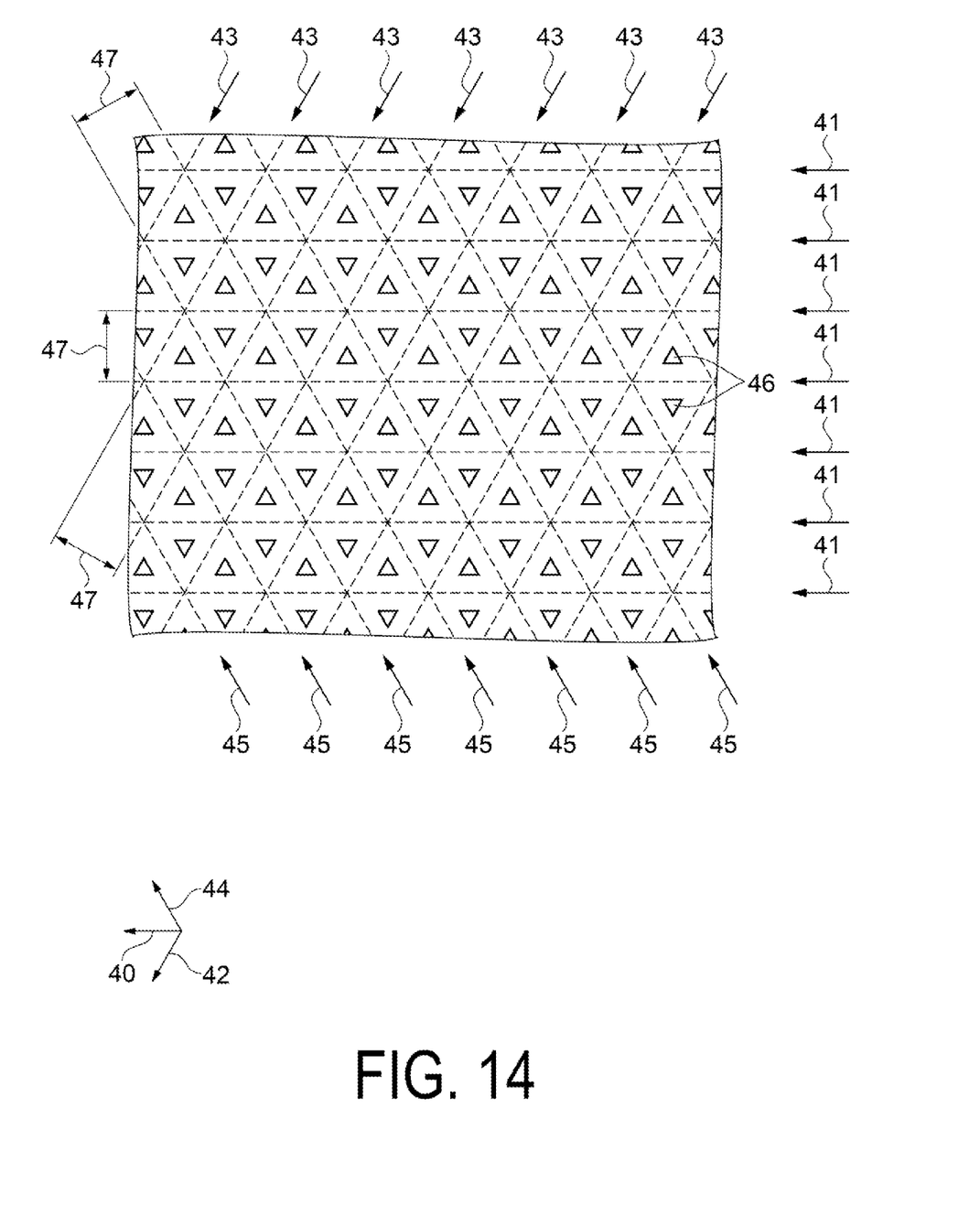
FIG. 14 is a schematic plan view for illustrating a pattern of a groove according to a second exemplary embodiment.

FIG. 14 illustrates a layout in which grooves are disposed in three directions. The present layout is an example of $30° \leq \theta \leq 120°$. A base material 23 includes a plurality of first grooves 41 extending in a first direction 40, a plurality of second grooves 43 extending in a second direction 42, and a plurality of third grooves 45 extending in a third direction 44. An angle formed between the first direction 40 and the second direction 42 is 60°. An angle formed between the first direction 40 and the third direction 44 is 60°.

A protruding portion 46 is formed in a portion surrounded by the first groove 41, the second groove 43, and the third groove 45. A pitch width 47 in each direction when the pulse laser 25 is scanned and applied in each direction is smaller than 100 μm. Thus, a surface in which a line is not observed and reflection is hardly caused is formed on a front surface 23a of the base material 23. The pitch width 47 in each direction is greater than a spot diameter 26 of the pulse laser 25. Thus, similarly to the first exemplary embodiment, the time for irradiation by the pulse laser 25 can be shorter than that when the pitch width 47 is smaller than the spot diameter 26 of the pulse laser 25.

Third Exemplary Embodiment

Figure 15:
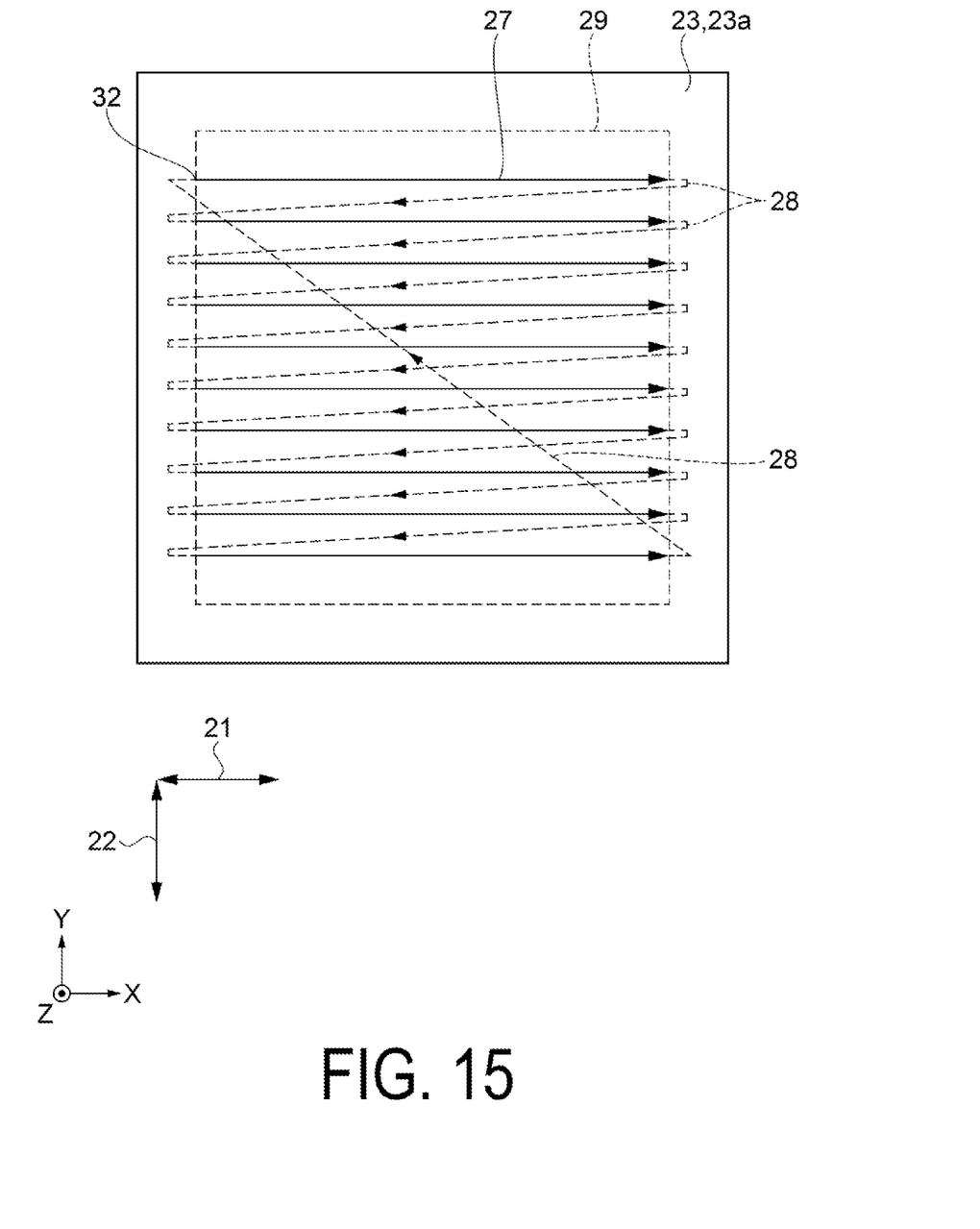
FIG. 15 is a schematic plan view for illustrating a method for manufacturing a groove according to a third exemplary embodiment.

In the first exemplary embodiment described above, as illustrated in FIG. 5, an advance direction of the pulse laser 25 on the irradiation path 27 in the first repeating step alternately switches between the positive X direction and the negative X direction. As illustrated in FIG. 15, an advance direction of the pulse laser 25 on an irradiation path 27 may be limited to the positive X direction. On a non-irradiation path 28, an advance direction of an optical axis 24c of a condensing optical system 24b moves in the negative X direction. Note that the advance direction on the irradiation path 27 may be the negative X direction, and the advance direction on the non-irradiation path 28 may be the positive X direction.

When a laser head 24 moves relatively to a base material 23, a direct-acting mechanism moves the base material 23 or the condensing optical system 24b in one direction. A backlash of the direct-acting mechanism does not easily affect the relative movement between the base material 23 and the condensing optical system 24b, and thus the direct-acting mechanism can relatively move the base material 23 and the condensing optical system 24b with a high degree of positional accuracy. Therefore, the laser head 24 can apply the pulse laser 25 with a high degree of positional accuracy.

Figure 16:
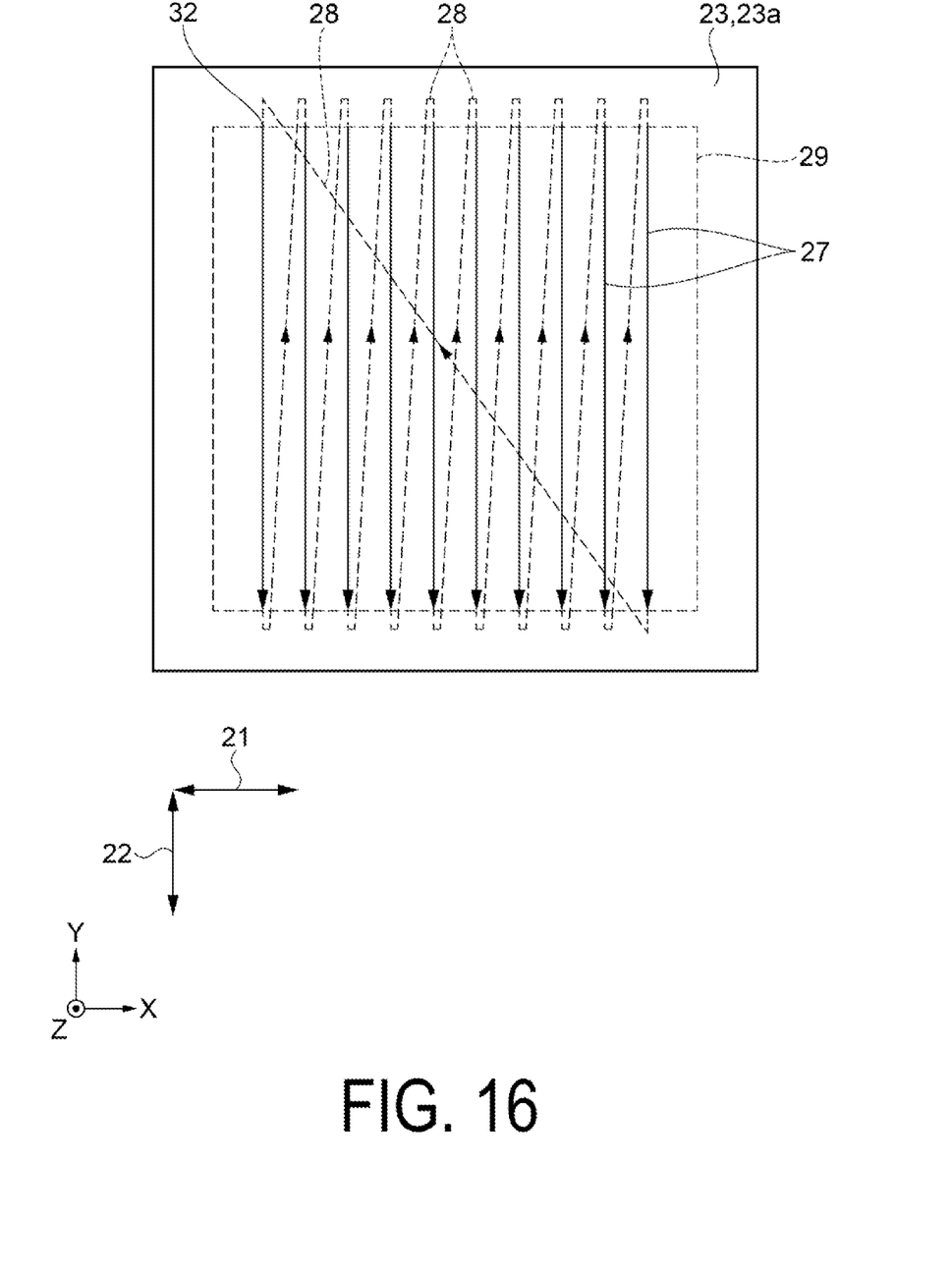
FIG. 16 is a schematic plan view for illustrating the method for manufacturing the groove.

As illustrated in FIG. 16, in a second repeating step, an advance direction of the pulse laser 25 on the irradiation path 27 may be limited to the negative Y direction. On the non-irradiation path 28, an advance direction of the optical axis 24c of the condensing optical system 24b moves in the positive Y direction. Note that the advance direction on the irradiation path 27 may be the positive Y direction, and the advance direction on the non-irradiation path 28 may be the negative Y direction. At this time, the laser head 24 can also apply the pulse laser 25 with a high degree of positional accuracy in the same manner as the first repeating step.

Fourth Exemplary Embodiment

The first groove 18 and the second groove 19 described above may be disposed in any of the dial 5, a train wheel bridge, the magnetic shield plate 16, the main plate 12, the reception component 13, a crown, and the like that are watch components. According to this configuration, the dial 5, the train wheel bridge, the magnetic shield plate 16, the main plate 12, the reception component 13, the crown, and the like can have a location where the intensity of the light 34 reflected in a region including the first groove 18 and the second groove 19 is different. In this way, a location where the brightness is different can be produced with good productivity.

Fifth Exemplary Embodiment

In the first exemplary embodiment, the first groove 18 and the second groove 19 are formed by using the pulse laser 25. A metal film may be provided on the front surface 23a of the base material 23. The metal film can be easily formed by plating and the like. The metal film may also be formed on the first groove 18 and the second groove 19. According to this configuration, a color tone of the front surface 23a of the base material 23 can be changed. This content can also be applied to the second to fourth exemplary embodiments.

What is claimed is:

1. A watch component comprising:
a metal member having a recessed portion that satisfies $$1.3*w<d,$$

wherein a depth of the recessed portion formed in an intersection region in which a groove portion of the metal member formed by laser processing along a first direction, a groove portion of the metal member formed by laser processing along a second direction, and a groove portion of the metal member formed by laser processing along a third direction intersect each other is d, and
a distance between vertices of two protruding portions that sandwich the groove portion formed along the first direction, the second direction, or the third direction is w.

2. The watch component according to claim 1, wherein a brightness L* in a CIE Lab L*a*b* system of the laser-processed portion of the watch component is equal to or less than 20.

* * * * *